(12) United States Patent
Nekorystnov

(10) Patent No.: US 9,363,365 B1
(45) Date of Patent: Jun. 7, 2016

(54) SYSTEM AND METHOD FOR EVALUATING THE QUALITY OF A COMMUNICATION SESSION

(71) Applicant: RingCentral, Inc., Belmont, CA (US)

(72) Inventor: Mikhail Nekorystnov, Castro Valley, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/697,555

(22) Filed: Apr. 27, 2015

(51) Int. Cl.
*H04L 12/28* (2006.01)
*H04M 3/22* (2006.01)
*H04M 7/00* (2006.01)

(52) U.S. Cl.
CPC ............ *H04M 3/2227* (2013.01); *H04M 7/006* (2013.01)

(58) Field of Classification Search
CPC .. H04W 24/08; H04L 29/06027; H04L 65/80
See application file for complete search history.

(56) References Cited

U.S. PATENT DOCUMENTS

| | | | |
|---|---|---|---|
| 7,865,361 B2 | 1/2011 | Rambo et al. | |
| 2004/0059572 A1* | 3/2004 | Ivanic et al. | 704/236 |
| 2005/0261895 A1* | 11/2005 | Bauer et al. | 704/216 |
| 2014/0379935 A1* | 12/2014 | Venkatasubramaniam et al. | 709/231 |

OTHER PUBLICATIONS

"PESQ," [online] [Retrieved on Apr. 28, 2015]; Retrieved from the Internet URL: http://en.wikipedia.org/wiki/PESQ, 3 pages.
"PEVQ," [online] [Retrieved on Apr. 28, 2015]; Retrieved from the Internet URL: http://en.wikipedia.org/wiki/PEVQ, 3 pages.

* cited by examiner

*Primary Examiner* — Shaq Taha
(74) *Attorney, Agent, or Firm* — Fish & Richardson P.C.

(57) ABSTRACT

Methods, systems, and apparatus, including computer programs encoded on a computer storage medium, for evaluating the quality of a communication session or of a communication path used for the communication session. One of the methods includes initiating a communication session between a first communications device and a second communications device, wherein initiating the communication session comprises routing session data for the communication session along a first communication path between the first communications device and the second communications device; generating, at the first communications device, a plurality of reference content samples; generating a recording of the communication session as received at a first destination along the first communication path; and evaluating a quality of the communication session or of the first communication path by comparing the plurality of reference content samples with the recorded communication session.

15 Claims, 4 Drawing Sheets

SYSTEM AND METHOD FOR EVALUATING THE QUALITY OF A COMMUNICATION SESSION

BACKGROUND

This disclosure relates to determining the quality of communication session or of a communication path used during the communication session.

Users of a communication service provider system can participate in communication sessions with other users. During the communication session, session data is transmitted between the communications devices of the users using a real-time communication channel. Examples of communication sessions may include voice-over-Internet-Protocol (VOIP) calls, videoconferences, and so on. Because the real-time synchronous communication channel is generally not a reliable communication channel, voice content sent over the real-time communication channel may be altered when played back at the receiving communications device.

SUMMARY

In general, one innovative aspect of the subject matter described in this disclosure can be embodied in methods that include the actions of initiating a communication session between a first communications device and a second communications device, wherein initiating the communication session comprises routing session data for the communication session along a first communication path between the first communications device and the second communications device; generating, at the first communications device, a plurality of reference content samples, wherein each reference content sample is a sample of content generated at the first communications device during the communication session; generating a recording of the communication session as received at a first destination along the first communication path; and evaluating a quality of the communication session or of the first communication path by comparing the plurality of reference content samples with the recorded communication session.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The first destination along the first communication path can be the second communications device. Routing session data can include routing the session data along the first communication path over a real-time communication channel. The actions can further include transmitting, by the first communications device, the plurality of reference content samples over a reliable communication channel to an evaluation system. The evaluation system can be the second communications device. Evaluating the quality can include: identifying, for each reference content sample, a corresponding portion of the recording of the communication session; and evaluating the quality by comparing the reference content samples to the corresponding portions of the communication session. Generating the plurality of reference content samples can include: sampling from voice content captured by a voice recording device of the first communications device during the communication session. Sampling from the voice content captured by the audio recording device can include: analyzing the captured content; and sampling from the captured content based on the analyzing. Generating the plurality of reference content samples can include: injecting synthetic reference voice content samples into the session data for the communication session. The actions can further include removing the synthetic reference voice content samples from the session data received at the second communications device prior to play back. The communication session can be a voice-over-Internet-Protocol (VOIP) call between the first communications device and the second communications device.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure generally describes techniques for evaluating the quality of communication session or of a communication path. In particular, during a communication session between a first communications device and a second communications device, reference content samples are generated at the first communications device and a recording of the communication session is generated at a first destination along a communication path between the first communications device and the second communications device. The destination may be the second communication device or an intermediate destination along the communication path. The reference content samples are compared to the recording of the communication session to evaluate the quality of the communication session or of the communication path.

Particular embodiments of the subject matter described in this disclosure can be implemented so as to realize one or more of the following advantages. A near real-time evaluation of voice quality during a communication session can be effectively performed. In particular, the near real-time evaluation can use a full reference (FR) voice quality evaluation algorithm to obtain an accurate measure of voice quality during the communication session in near real-time. The quality evaluation can be performed using both voice snippets from the real-time communication session and synthetic voice snippets that were injected into the real-time communication session. The evaluation can be performed without adversely impacting the user experience of the users participating in the communication session.

Figure 1:
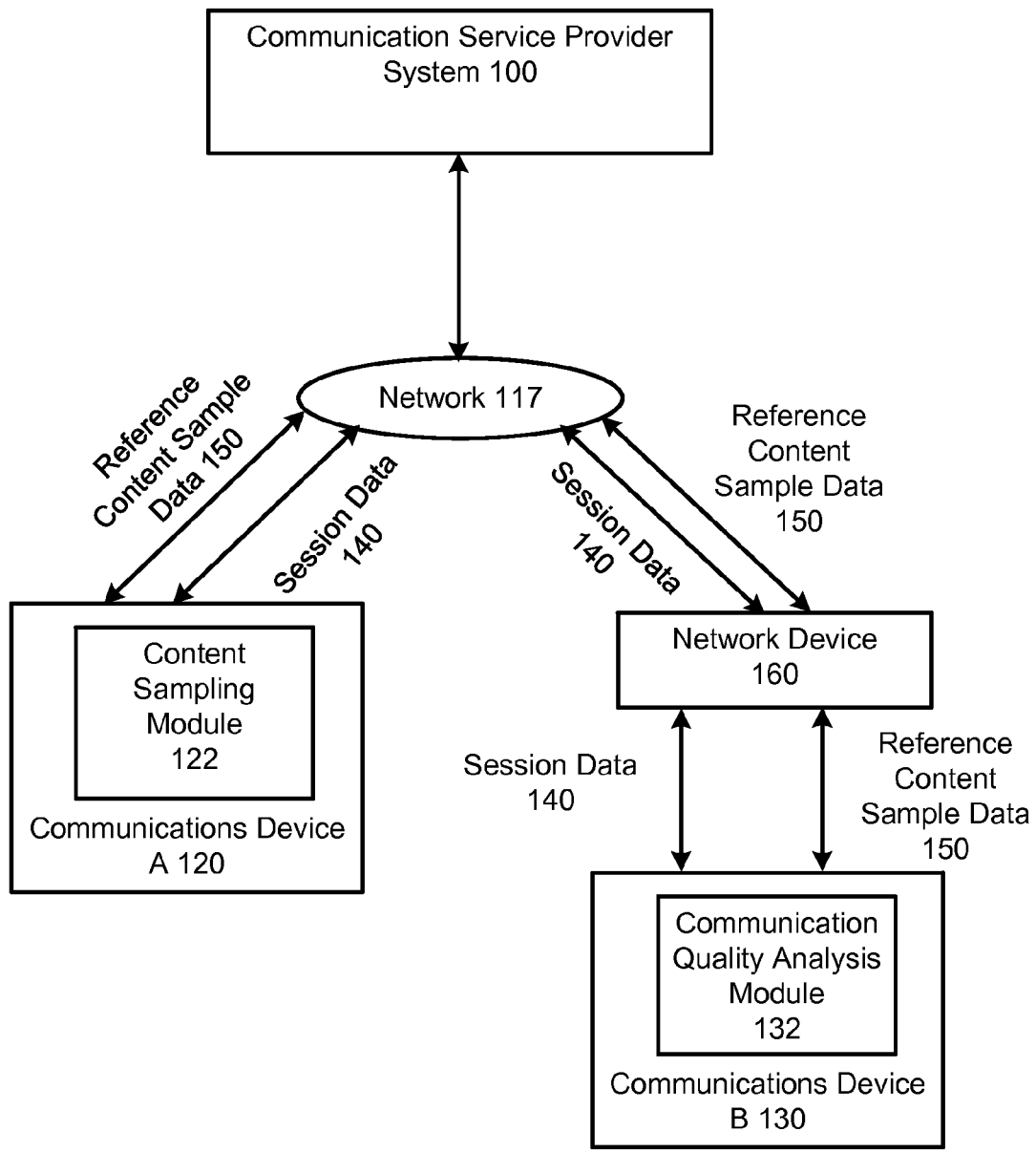
FIG. 1 shows an example communication service provider system.

FIG. 1 shows an example communication service provider system 100. The communication service provider system 100 is an example of a system implemented as computer programs on one or more computers in one or more locations, in which the systems, components, and techniques described herein can be implemented.

The communication service provider system 100 provides communication services to users of the system. In some examples, the communication service provider system 100 may be a hosted private branch exchange (PBX) system that provides PBX services that include voice-over-Internet-Protocol (VOIP) telephony services to users of the system. The services provided by the communication service provider system 100 can also include other kinds of communication instead of or in addition to VOIP telephony services. For example, the communication services provided by the communication service provider system 100 can also include one or more of: short message service (SMS) messaging, faxing, instant messaging, video conferencing, e-mail, and so on.

Users of the communication service provider system 100 can use various communications devices, e.g., a communications device A 120 and a communications device B 130, to communicate with the communication service provider system 100 over a network 117. The communications devices can include, for example, mobile devices, e.g., smartphones or tablet computers, landline phones, e.g., plain old telephone service (POTS) phones or voice-over-Internet Protocol (VOIP) softphones, computer, audio or video conferencing consoles, and facsimile (fax) machines.

The network 117 may be, e.g., a local area network (LAN), a wide area network (WAN), or a combination of the two. Though not illustrated, requests from communications devices intended for the communication service provider system 100 can be routed through other provider networks (e.g. cellular networks, PSTN, wireless networks, etc.) before reaching the network 117.

The communication service provider system 100 allows users of the system to participate in communication sessions with other users of the system using the communications devices.

A communication session is an interaction between two communications devices in which session data that includes voice content is transmitted between the two devices over a real-time communication channel. An example of a communication session may be a VOIP call placed from communications device A 120 to communications device B 130. Depending on the type of communication session, other types of content may also be transmitted between the devices as part of the session data. For example, during a video conference, video content is also transmitted between the two devices as part of the session.

In particular, in response to a request received from communications device A 120 to communicate with the communications device B 130, the communication service provider system 100 initiates a communication session between the two devices. During the communication session, session data 140 is routed between the communications device A 120 and the communications device B 130 along a communication path and over a real-time communication channel. That is, during the session, session data transmitted by one of the communications devices is routed between one or more intermediate destinations until the session data reaches the final destination, i.e., the other communications device. Intermediate destinations along the communication path can include network devices, e.g., a network device 160. The network device 160 can be, e.g., a router, a wireless access point, a gateway, a switch, an intermediate server, and so on, that is interposed between the communications device A 120 and the communications device B 130 on the communication path. Generally, the communication channel used to transmit the data is a real-time communication channel that uses non-reliable IP transport, e.g., a channel that uses User Datagram Protocol (UDP).

In some cases, it may be desirable to evaluate the quality of the communication session between the communications device A 120 and the communications device B 130 or of the communication path used for the communication session. In order to evaluate the quality, the communications device A 120 includes a content sampling module 122. During the communication session, the content sampling module 122 generates reference content samples that are then transmitted to the communications device B 122 over the real-time communication channel as part of the session data 140 for the communication session. Generating reference content samples is described in more detail below with reference to FIG. 2.

In addition to being included in the session data 140, the reference content samples are also transmitted separately as reference content sample data 150 over a reliable communication channel to a system that evaluates the quality of the communication session, e.g., to a communication quality analysis module 132 on the communications device B 130 or to a separate system if the evaluation is not being performed on the communications device B 130. The reliable communication channel is different from the real-time communication channel and may be, e.g., a channel that uses the Transmission Control Protocol (TCP).

In some embodiments, the communication session is a Web Real-Time Communication (WebRTC) session. During a WebRTC session, session data 140 is transmitted between the communications device A 120 and the communications device B 130 over one or more bi-directional real-time communication channels (RTCChannels) established through a web browser, e.g. Chrome browser available from Google, Inc., that transmit voice and/or video and one or more reliable bidirectional data channels. In these embodiments, during the communication session, the session data 140 may be transmitted over an RTCChannel that is unreliable, while the reference content sample data 150 is transmitted over a data channel that is reliable.

In order to evaluate the quality of the communication session or of the communication path, the communication quality analysis module 132 on the communications device B 130 records the communication session as the session data is received at the communications device B 130. In example embodiments where the evaluation is performed at the communications device B 130, the communication quality analysis module 132 performs the quality evaluation by comparing the reference content samples in the reference content sample data 150 received over the reliable communication channel with the recording of the communication session generated using session data received over the real-time communication channel. In example embodiments where the evaluation is performed at a different system, the communication quality analysis module 132 transmits the recording of the communication session to the different system over the reliable communication channel and the different system then uses the recording to perform the evaluation. Comparing reference content samples with a recording of a session to evaluate quality is described in more detail below with reference to FIG. 3.

While FIG. 1 shows the communication session being recorded at the communications device B 130, in some embodiments the communication session is instead recorded at an intermediate destination along the communication path. For example, the network device 160 on the communication path between the communications device A 120 and the communications device B 130 can record the communication session. The network device 160 can then either receive the reference content sample data 150 and perform the evaluation or transmit the recording to a different system that then performs the evaluation.

Figure 2:
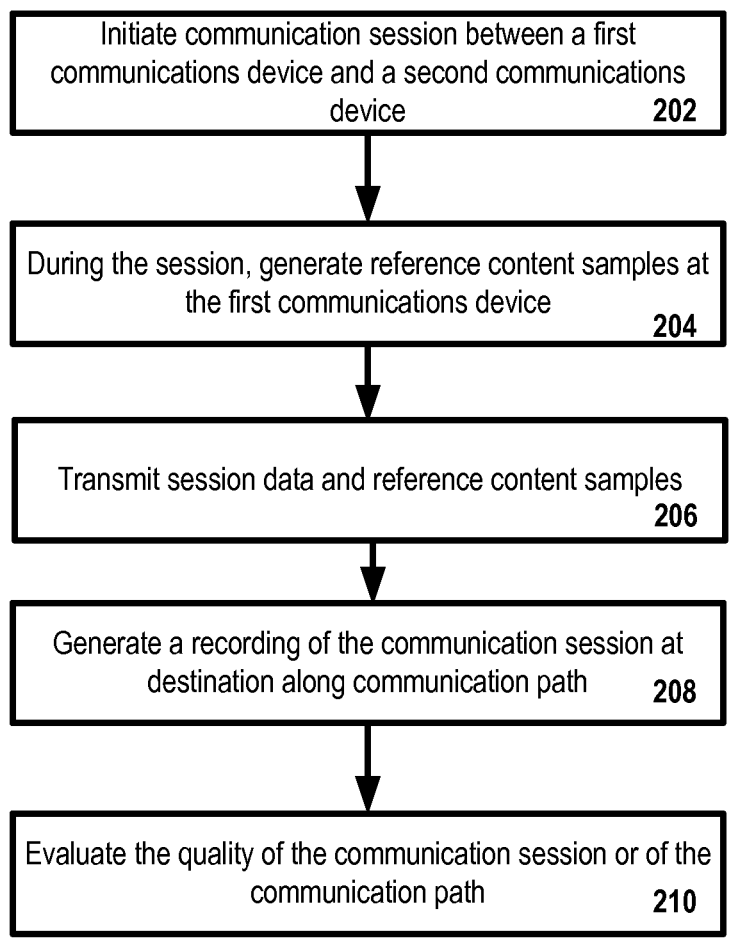
FIG. 2 is a flow diagram of an example process for evaluating the quality of a communication session or of a communication path.

FIG. 2 is a flow diagram of an example process 200 for evaluating the quality of a communication session or of a communication path. The process 200 can be performed by a system of one or more computers.

At step 202, a communication session between a first communications device and a second communications device is initiated. For example, the communication session can be a VOIP call, a video conference, or another session where session data that includes voice content is transmitted between the first communications device and the second communications device along a communication path and over a real-time communication channel. Depending on the kind of communication session that is being initiated, other types of content, e.g., video content, can also be transmitted during the communication session.

At step 204, during the communication session, reference content samples are generated at the first communications device. The reference content samples are samples of voice content generated at the first communications device for transmission to the second communications device during the communication session as part of the session data. The reference content samples can be generated using any of a variety of techniques.

For example, the reference content samples are generated by sampling from content captured by the microphone or other voice recording device of the first communications device during the communication session. In some embodiments, the voice content captured by voice recording device is sampled at specified intervals during the communication session, with the samples each being of a specified length.

In some other embodiments, the voice content captured by the voice recording device is analyzed and the reference content samples are generated based on the analysis. For example, the captured voice content can be analyzed to detect instances when the user of the first communications device is speaking, i.e., as opposed to listening to play back of voice content received at the first communications device during the communication session. The voice content can then only be sampled to generate a reference content sample when it has been determined that the user of the first communications device is speaking. As another example, frequencies of the audio in the captured voice content can be analyzed and the reference content samples can be generated to ensure that a wide range of frequencies are covered by the reference content samples captured during the communication session. As another example, the amplitudes of audio in the captured voice content can be analyzed and the reference content samples can be generated to ensure that a wide range of amplitudes are covered by the reference content sample captured during the communication session. As another example, the captured voice content can be analyzed to identify potential distortions of frequencies in the sample, i.e., to identify frequencies that are likely to become a different frequency during transmission of the content over the real-time communication channel, and the reference content samples can be generated to include the identified potential frequency distortions.

As another example, the reference content samples generated from the content captured by the voice recording device of the first communications device are augmented with synthetic reference content samples. That is, synthetic audio content can be injected into the session data being transmitted during the communication session. In some embodiments, the synthetic audio content includes full spectrum test samples that cover the entire spectrum of audible voice frequencies and an entire predetermined range of amplitudes. In addition to or instead of the full spectrum test samples, the captured voice content can be analyzed and, if it is determined that a particular range of audible frequencies is missing from the captured voice content, a synthetic audio sample can be generated that includes audio in the missing range of frequencies and the synthetic audio sample can be injected into the session data and used as a synthetic reference content sample. The synthetic audio content samples can be injected into the session data at appropriate points, e.g., in response to determining from the captured voice content that a user of the first communications device is not speaking.

At step 206, session data that includes the reference content samples is transmitted to the second communications device along the communication path over the real-time, i.e., unreliable, communication channel and the reference content samples are separately transmitted to the system performing the evaluation over a reliable communication channel. As described above, in some embodiments, the system performing the evaluation is the second communications device. In some other embodiments, the system performing the evaluation is a separate system from the second communications device. If the system performing the evaluation is the second communication device, the reference content samples can be transmitted to the second communications device over the reliable communication channel in parallel with the session data being transmitted over the real-time communication channel.

At step 208, a recording of the communication session is generated at a first destination along the communication path. In some embodiments, the first destination along the communication path is the second communications device that is participating in the communication session with the first communications device. In some other embodiments, the first destination is an intermediate destination along the communication path, e.g., a router, gateway, or other system interspersed between the first device and the second communications device on the communication path. That is, during the communication session and the first destination, the communication session is recorded as the session data is received by the destination over the real-time communication channel. Optionally, if any synthetic audio content is detected in the received session data, the injected synthetic content can be removed at the first destination before the session data is played back for a user or transmitted to the next destination along the communication path.

At step 210, the quality of the communication session or of the communication path is evaluated by comparing the reference content samples generated at the first communications device with the recorded communication session. Evaluating the quality of the communication path or of the communication session is described below with reference to FIG. 3.

In some embodiments, during the communication session, the generation of the reference content samples and the recording the communication session can be initiated or terminated in response to detecting that a trigger event has occurred. For example, the communication service provider system can detect that the trigger event has occurred and, in response, transmit instructions to the first communications device and the destination that cause the first communications device to either begin or terminate generating the reference content samples and the destination to begin or terminate recording the communication session. The trigger event may be, for example, detecting that a network event has occurred along the communication path, detecting that a global event has occurred, e.g., an increase or decrease in active users or active communication sessions, detecting that a particular network traffic or bandwidth metric has satisfied a threshold value, or detecting that instructions have been received from a system administrator or other entity.

Figure 3:
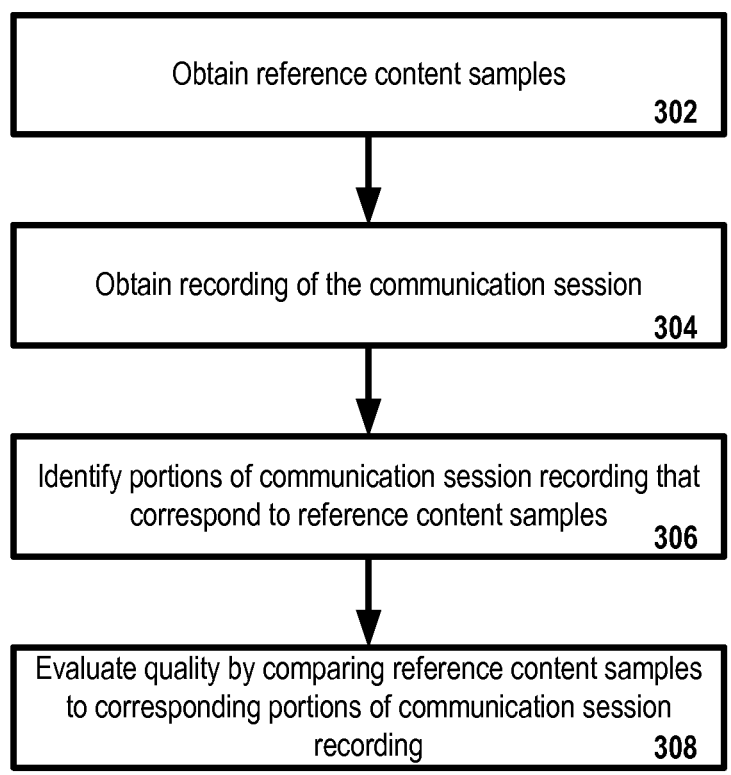
FIG. 3 is a flow diagram of an example process for comparing reference content samples with a recording of a communication session to evaluate the quality of the communication session or of a communication path.

FIG. 3 is a flow diagram of an example process 300 for comparing reference content samples with a recording of a communication session to evaluate the quality of the communication session or of a communication path.

The process 300 can be performed by a quality evaluation system that includes one or more computers. In particular, in some embodiments, the process 300 is performed at the destination that is recording the communication session, e.g., the second communications device or an intermediate destination along the communication path. In some other embodiments, the process 300 is performed at a system different from the destination that records the communication session, e.g., at a communications service provider system.

At step 302, reference content samples are obtained. In particular, the reference content samples are obtained over a reliable communication channel, e.g., a communication channel that is different from the real-time communication channel used to transmit session data during the communication session. For example, the reliable communication channel may be a channel that uses TCP. Thus, the first communications device transmits the reference content samples over the reliable communication channel separately from the session data, which is transmitted over a real-time communication channel.

At step 304, a recording of the communication session is obtained. If the process 300 is performed at the destination that generated the recording, the recording is obtained by accessing the recording from local storage. If the process 300 is performed at a system different from the system that generated the recording, the recording is received from the destination that generated the recording over the reliable communication channel. The recording of the communication session is a recording generated using session data that was received over a real-time communication channel.

At step 306, portions of the recording of the communication session that correspond to each of the reference content samples are identified. In particular, signal analysis is performed on the recording of the communication session to identify, for each reference content sample, the portion of the recording that corresponds to the reference content sample. The signal analysis can be performed in any of a variety of ways. For example, at the first communication device, special packets can be inserted into the session data to identify the beginning and the end of each content sample. The recording of the session data is then analyzed to identify the special packets to determine the portion of the recording that corresponds to each reference content sample. As another example, audio peaks or frequency peaks can be identified in the reference content sample and matched to audio peaks or frequency peaks in the recording. The beginning and the end of the portion of the recording that corresponds to the reference content sample can then be identified by time shifting backward and forward from the identified peaks.

At step 308, the quality of the communication session or of the communication path is evaluated by comparing the reference content samples with the corresponding portions of the recording of the communication session. The quality can be evaluated by comparing the reference content samples to the portions of the recording using any conventional full reference (FR) voice-quality test algorithm. For example, the quality can be evaluated using the Perceptual Evaluation of Speech Quality (PESQ) algorithm to generate a PESQ score for the recording of the communication session that represents a measure of the quality of the communication session, the communication path, or both.

Because the first communications device sends the reference content samples over the reliable communication channel in parallel with sending the session data over the real-time communication channel, in embodiments where the evaluation is performed at the destination that records the session, the quality evaluation can be performed in near real-time, i.e., during the communication session and shortly after recording the portion of the session that corresponds to the most recently received reference content sample. The quality scores can then be updated repeatedly during the communication session to provide an accurate measure of how the voice quality has changed over time during the session. In some embodiments, how frequently reference content samples are generated, the duration of the generated voice content samples, or both can be adjusted during the communication session. For example, a user may be able to modify the duration of the generated voice content samples or how frequently the samples are generated. As another example, how frequently reference content samples are generated, the duration of the generated voice content samples, or both can be adjusted automatically based on the quality scores being generated during a communication session. For example, if a given quality score exceeds a threshold value, samples can be generated less frequently, can have a reduced duration, or both. Once the quality score falls below the threshold value, the frequency or duration of the samples can be increased until the quality score again exceeds threshold value.

Figure 4:
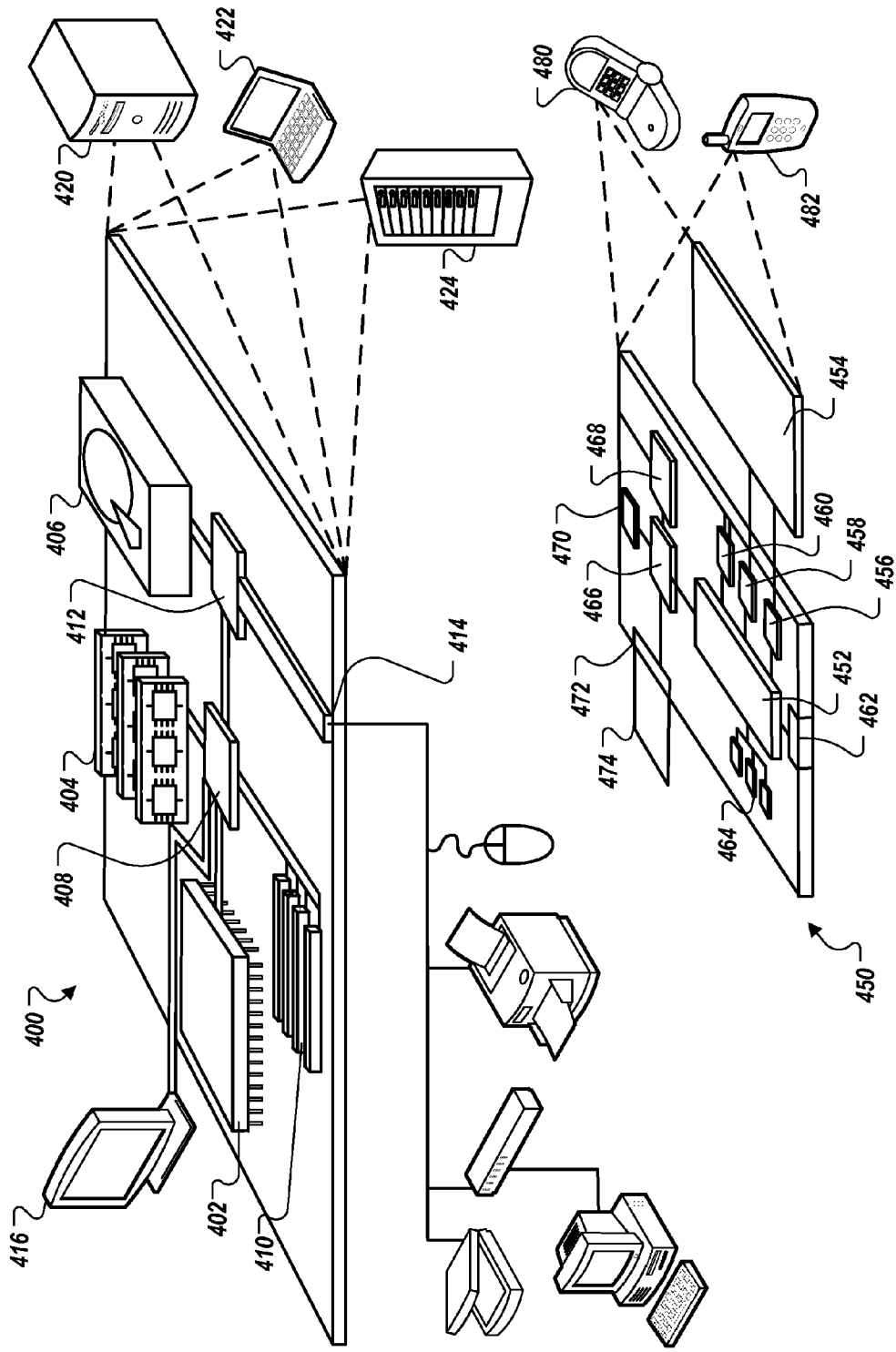
FIG. 4 shows example computing devices.

FIG. 4 is a block diagram of example computing devices 400 and 450. For example, either of the computing devices 400 and 450 may be one of the communications devices A 120 and B 130 of FIG. 1. As another example, the computing device 400 may be one of the computers included in the communication service provider system 100 of FIG. 1. Computing device 400 can represent various forms of digital computers, such as laptops, desktops, workstations, personal digital assistants, servers, blade servers, mainframes, and other appropriate computers. Computing device 450 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit embodiments of the inventions described and/or claimed in this document.

As shown in FIG. 4, computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other embodiments, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In some embodiments, the memory 404 is a computer-readable medium. In some embodiments, the memory 404 is a volatile memory unit or units. In some other embodiments, the memory 404 is a non-volatile memory unit or units.

The storage device 406 is capable of providing mass storage for the computing device 400. In some embodiments, the storage device 406 is a computer-readable medium. In various different embodiments, the storage device 406 may be a floppy disk device, a hard disk device, an optical disk device, or a tape device, a flash memory or other similar solid state memory device, or an array of devices, including devices in a storage area network or other configurations. In some embodiments, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In some embodiments, the high-speed controller 408 is coupled to memory 404, display 416 (e.g., through a graphics processor or accelerator), and to high-speed expansion ports 410, which may accept various expansion cards (not shown). In the embodiments, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In some embodiments, the memory 464 is a computer-readable medium. In some embodiments, the memory 464 is a volatile memory unit or units. In some other embodiments, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In some embodiments, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 1270 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   initiating a communication session between a first communications device and a second communications device, wherein initiating the communication session comprises routing session data for the communication session along a first communication path between the first communications device and the second communications device over a real-time communication channel;
   generating, at the first communications device, a plurality of reference content samples, wherein each reference content sample is a sample of content generated at the first communications device during the communication session, and wherein generating the plurality of reference content samples comprises injecting synthetic reference voice content samples into the session data for the communication session being transmitted over the real-time communication channel;
   generating a recording of the communication session as received at a first destination along the first communication path;
   transmitting, by the first communications device, the plurality of reference content samples over a reliable communication channel to an evaluation system, wherein the synthetic content samples are transmitted both as part of the session data over the real-time communication channel and over the reliable communication channel to the evaluation system; and
   evaluating a quality of the communication session or of the first communication path by comparing the plurality of reference content samples with the recorded communication session.

2. The method of claim 1, wherein the first destination along the first communication path is the second communications device.

3. The method of claim 1, wherein the evaluation system is the second communications device.

4. The method of claim 1, wherein evaluating the quality comprises:
   identifying, for each reference content sample, a corresponding portion of the recording of the communication session; and
   evaluating the quality by comparing the reference content samples to the corresponding portions of the communication session.

5. The method of claim 1, wherein generating the plurality of reference content samples comprises:
   sampling from voice content captured by a voice recording device of the first communications device during the communication session.

6. The method of claim 5, wherein sampling from the voice content captured by the audio recording device comprises:
   analyzing the captured content; and
   sampling from the captured content based on the analyzing.

7. The method claim 1, further comprising:
   removing the synthetic reference voice content samples from the session data received at the second communications device prior to play back.

8. The method of claim 1, wherein the communication session is a voice-over-Internet-Protocol (VOIP) call between the first communications device and the second communications device.

9. A system comprising one or more computers and one or more storage devices storing instructions that when executed by the one or more computers cause the one or more computers to perform operations comprising:
   initiating a communication session between a first communications device and a second communications device, wherein initiating the communication session comprises routing session data for the communication session along a first communication path between the first communications device and the second communications device over a real-time communication channel;
   generating, at the first communications device, a plurality of reference content samples, wherein each reference content sample is a sample of content generated at the first communications device during the communication session, and wherein generating the plurality of reference content samples comprises injecting synthetic reference voice content samples into the session data for the communication session being transmitted over the real-time communication channel;
   generating a recording of the communication session as received at a first destination along the first communication path;
   transmitting, by the first communications device, the plurality of reference content samples over a reliable communication channel to an evaluation system, wherein the synthetic content samples are transmitted both as part of the session data over the real-time communication channel and over the reliable communication channel to the evaluation system; and
   evaluating a quality of the communication session or of the first communication path by comparing the plurality of reference content samples with the recorded communication session.

10. The system of claim 9, wherein the first destination along the first communication path is the second communications device.

11. The system of claim 9, wherein the evaluation system is the second communications device.

12. The system of claim 9, wherein evaluating the quality comprises:
    identifying, for each reference content sample, a corresponding portion of the recording of the communication session; and
    evaluating the quality by comparing the reference content samples to the corresponding portions of the communication session.

13. The system of claim 9, wherein generating the plurality of reference content samples comprises:
    sampling from voice content captured by a voice recording device of the first communications device during the communication session.

14. The system of claim 13, wherein sampling from the voice content captured by the audio recording device comprises:
    analyzing the captured content; and
    sampling from the captured content based on the analyzing.

15. A computer program product encoded on one or more non-transitory computer storage mediums, the computer program comprising instructions that when executed by one or more computers cause the one or more computers to perform operations comprising:

initiating a communication session between a first communications device and a second communications device, wherein initiating the communication session comprises routing session data for the communication session along a first communication path between the first communications device and the second communications device over a real-time communication channel;

generating, at the first communications device, a plurality of reference content samples, wherein each reference content sample is a sample of content generated at the first communications device during the communication session, and wherein generating the plurality of reference content samples comprises injecting synthetic reference voice content samples into the session data for the communication session being transmitted over the real-time communication channel;

generating a recording of the communication session as received at a first destination along the first communication path;

transmitting, by the first communications device, the plurality of reference content samples over a reliable communication channel to an evaluation system, wherein the synthetic content samples are transmitted both as part of the session data over the real-time communication channel and over the reliable communication channel to the evaluation system; and evaluating a quality of the communication session or of the first communication path by comparing the plurality of reference content samples with the recorded communication session.